United States Patent
Douglas

[15] 3,653,372
[45] Apr. 4, 1972

[54] CHEMICALLY HEATED CONTAINER

[72] Inventor: Beverly Douglas, 423 Sunnyside Drive, Nashville, Tenn. 37205

[22] Filed: Dec. 12, 1969

[21] Appl. No.: 884,515

[52] U.S. Cl. .................................. 126/263, 126/262
[51] Int. Cl. .............................. A47g 23/04, F24j 1/00
[58] Field of Search .............. 126/263, 262; 44/3 R, 3 A

[56] References Cited

UNITED STATES PATENTS

| 820,638 | 5/1906 | Gabriel | 126/263 |
| 2,042,103 | 5/1936 | Hyde, Jr. et al. | 126/263 X |
| 2,615,443 | 10/1952 | Sukacev | 126/263 |

FOREIGN PATENTS OR APPLICATIONS

| 158,259 | 3/1940 | Austria | 126/263 |
| 856,079 | 3/1940 | France | 126/262 |

*Primary Examiner*—Charles J. Myhre
*Attorney*—Harrington A. Lackey

[57] ABSTRACT

A chemically heated stove having a heating chamber containing a solid chemical reactant and a frangible capsule containing another chemical reactant, and a pressure actuator member, such as a lever or thumb-screw, mounted on the container for breaking the capsule upon the application of pressure to cause the chemical reactants to mix in an exothermic reaction.

In a preferred form of the invention, the stove is made integral with the bottom of a comestible container, and the walls are insulated, not only to make the heating of the comestible more efficient, but to protect the hand of the person holding the container.

7 Claims, 6 Drawing Figures

PATENTED APR 4 1972 3,653,372

BEVERLY DOUGLAS

INVENTOR

BY Harrington A. Lackey
ATTORNEY

BEVERLY DOUGLAS
INVENTOR

BY
Harrington A. Lackey
ATTORNEY

CHEMICALLY HEATED CONTAINER

BACKGROUND OF THE INVENTION

This invention relates to a chemically heated stove, and more particularly to a chemically heated comestible container.

Self-heating or chemically heated containers for foods and beverages are old in the art. However, most of these chemically heated containers employ as their two chemical reactants, unslaked lime and water. Although unslaked lime and water create a highly exothermic reaction, nevertheless the products of the reaction are very caustic and create considerable vapor pressure within a closed chamber.

Furthermore, most chemically heated containers require a sharp-pointed instrument to penetrate, and usually rupture, the wall of the heated container in order to further penetrate or perforate a membrane separating the chemical reactants, before the chemical reactants can be mixed to produce the exothermic reaction. Such containers usually require a separate pointed instrument, such as an ice pick or a nail. Other such containers have sharp-pointed instruments mounted in association with the container and require a hammer-like tool in order to strike a blow upon the sharp-pointed instrument in order to perforate the partition between the chemical reactants. Furthermore, in order to obtain enough holes or perforations to provide an adequate chemical reaction, the sharp-pointed instrument must be used again and again, in other words, once for each hole desired.

SUMMARY OF THE INVENTION

It is, therefore, an object of this invention to provide a chemically heated stove or container in which a frangible capsule containing one chemical reactant is disposed within an enclosed heating chamber containing the other chemical reactant. An actuator for breaking the capsule is operatively mounted upon the heating chamber so that the capsule is completely broken and the reactants mixed in one operation without any sharp-pointed instruments or additional tools, and without rupturing the heating chamber.

Furthermore, the chemically heated stove, made in accordance with this invention, incorporates chemical reactants which are not only readily available and can produce the desired amount of heat from an exothermic reaction with a minimum of cost, but which will produce non-gaseous, neutral products of reaction.

Another object of this invention is to produce a chemically heated container having insulated walls to maintain the heat of the contents more efficiently and also to protect the hand of the consumer. Moreover, all of the materials used in the container, including the chemical reactants are comparatively inexpensive, so that the containers may be easily and cheaply manufactured and utilized as disposable items.

DESCRIPTION OF THE PREFERRED EMBODIMENTS

Figure 1:
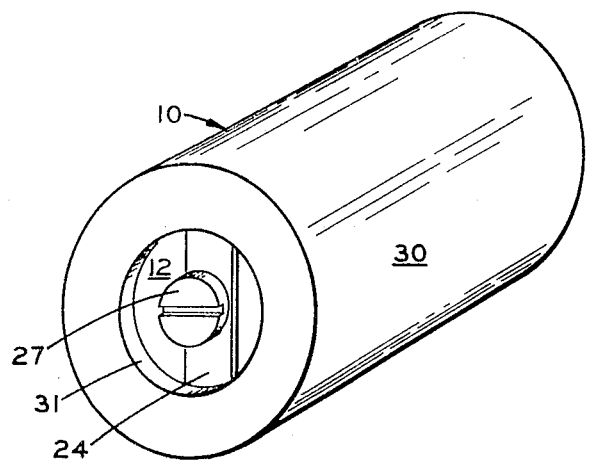
FIG. 1 is a bottom perspective view of one form of chemically heated container made in accordance with this invention.
Figure 2:
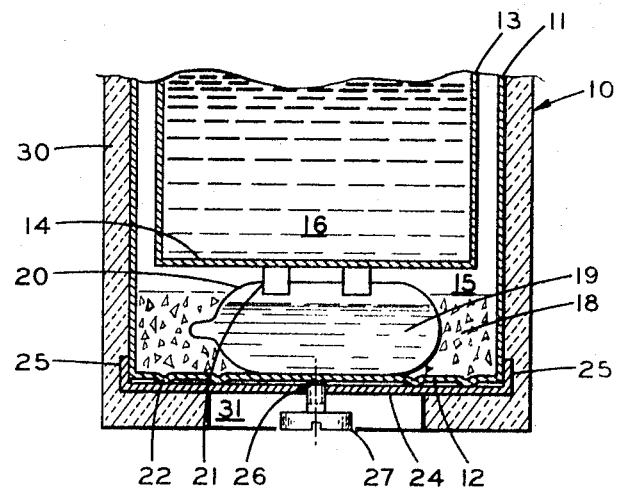
FIG. 2 is an enlarged sectional elevation of the bottom portion of the container disclosed in FIG. 1.
Figure 3:
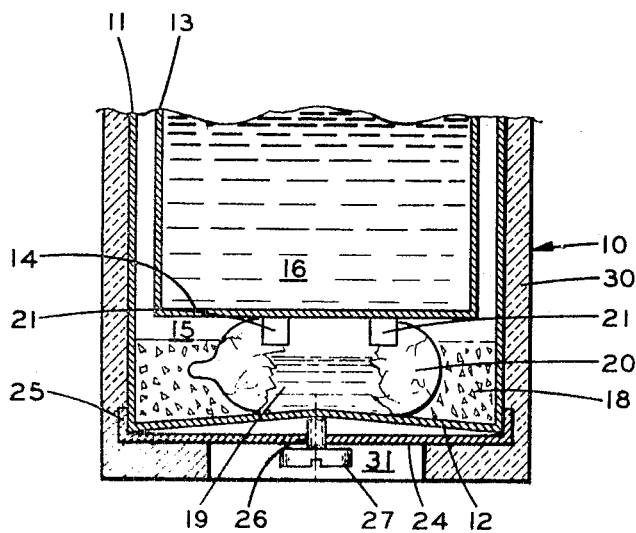
FIG. 3 is a view similar to FIG. 2 but showing the actuator member in operative position for rupturing the capsule.

Referring now to the drawings in more detail, FIGS. 1 – 3 disclose a container 10 having an outer side wall 11, an outer bottom wall 12, an inner side wall 13, and an inner bottom wall 14, defining an outer heating chamber 15 and an inner comestible receptacle or chamber 16. Although the side walls 11 and 13 are preferably concentric cylinders, nevertheless they could be other shapes if desired. The comestible chamber 16 may contain any type of food or beverage desired to be heated.

Disposed within the bottom of the heating chamber 15 is a chemical reactant, preferably dry potassium hydroxide flakes 18. The other chemical reactant 19, adapted to react with the dry chemical flakes 18, and preferably orthophosphoric acid, is completely contained within a frangible capsule, such as the glass ampoule 20, supported in brackets 21 fixed to the bottom wall 14 of the comestible chamber 16.

In the container 10, the bottom wall 12 is preferably flexible enough that it may have limited movement toward and away from the wall 14. The wall 12 may be provided with annular ribs 22, if desired, in order to make the wall 12 more flexible, or more expansible and contractable. Also, the location of the brackets 21, the spacing between the walls 14 and 12, and the size of the capsule 20 are such that the capsule 20 preferably rests against the bottom wall 12 in a stationary rupturing position.

An actuator bracket 24, preferably U-shaped and diametrically spanning the bottom wall 12 and of rigid material relative to the bottom wall 12, is fixed across the bottom wall 12. The upturned end portions 25 of the actuator bracket 24 are adapted to tightly fit against the exterior of the side wall 11. A threaded opening 26 extends through the central portion of the actuator bracket 24 to receive a threaded actuator member or screw member 27, having an enlarged head. By turning the head of the screw member 27, either manually or with a screw driver, or coin, the upper end of the screw member 27 forces the flexible wall 12 upwardly with ever-increasing pressure against the stationary capsule 20, until the capsule 20 ruptures to permit the liquid chemical 19 to come into intimate contact with the solid reactant 18. As the chemical agents 18 and 19 mix, and react exothermically, the air within the heating chamber 15, that is the space between the side walls 13 and 11 as well as between the bottom walls 14 and 12, is heated. Since the walls 13 and 14 are preferably made of materials of high thermal conductivity, heat is rapidly transferred over a wide area from the heating chamber 15 to the contents of the comestible chamber 16.

The exteriors of the side wall 11 and the bottom wall 12 are encased or covered with a layer of insulating material, such as polystyrene foam 30, with the exception of a circular hole 31 in the bottom to permit manipulation of the turn screw 27. Thus, not only is heat loss minimized by the insulating layer 30, but also the container 10 may be held in the hand after the chemical reaction has been initiated, and even while the heated contents are being consumed.

The preferred form of chemical reactants 18 and 19, as previously mentioned, are potassium hydroxide flakes 18 and orthophosphoric acid 19 as an 85 percent syrup. The equation of the reaction is as follows:

$$2\ KOH + H_2PO_4 \longrightarrow K_2PO_4 + 2\ H_2O + Heat$$

It will be noted in the above equation that in addition to the heat produced, the products of reaction are a solid potassium phosphate and liquid water. No gases are formed and both of the reactant products are neutral.

A comestible receptacle or chamber 16 having a capacity of 240 ml (8 oz.) of liquid at 25° C. will require 18 Kcal. to have its temperature raised to the boiling point of water, 100° C. Assuming a heat loss due to insulation leakage of 16 percent, the reaction must generate (18 × 0.16) + 18 Kcal. = 21 Kcal. Thus, by computation based on the molecular weights of the above reaction equation, it will be determined that 5.9 grams of orthophosphoric acid and 5.0 grams of potassium hydroxide flakes will be required to generate the above required 21 Kcal.

The products of reaction are not only non-gaseous but non-toxic, and have a neutral pH value. The reactants are readily available in commerce in technical grade and are economical. The reaction has a high heat yield. Based upon current prices, the cost of the above chemical reagents for boiling 8 ounces of liquid in the container 10 would be about 1 cent. This cost should be less for quantity production.

Figure 4:
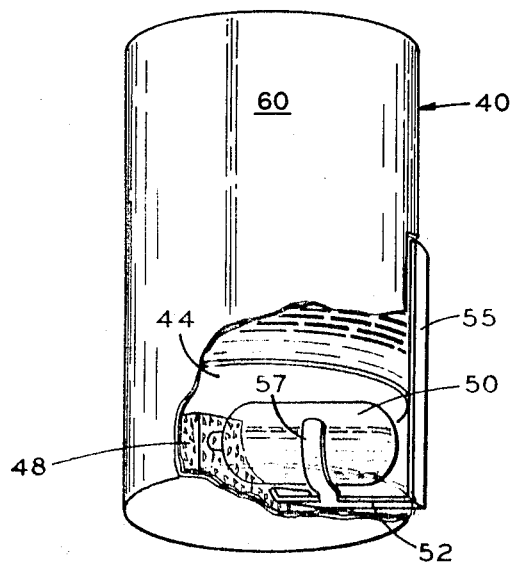
FIG. 4 is a perspective side view of another form of container made in accordance with this invention with the bottom portion of the wall broken away to disclose the heating chamber.
Figure 5:
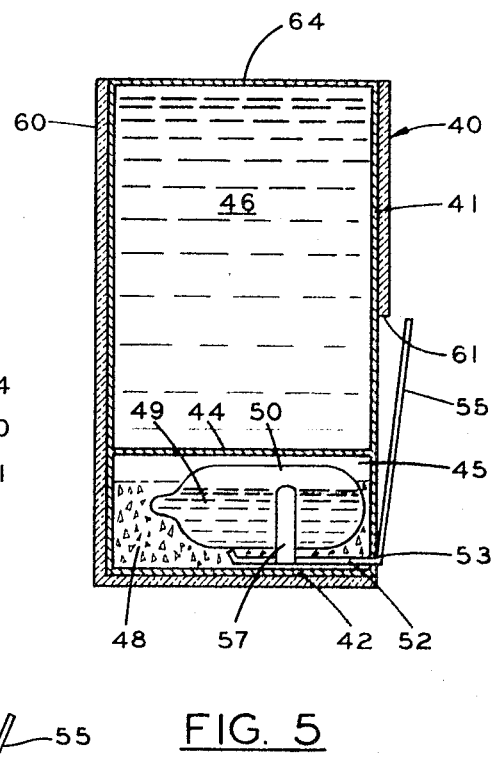
FIG. 5 is a sectional elevation of the container disclosed in FIG. 4.
Figure 6:
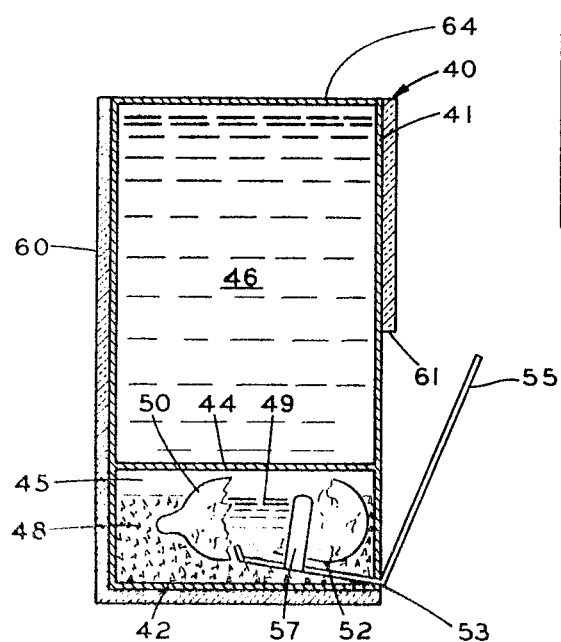
FIG. 6 is a view similar to FIG. 5 disclosing the actuator member in operative position for breaking the capsule.

The container 40 disclosed in FIGS. 4, 5 and 6 has a single cylindrical side wall 41, an outer bottom wall 42 and an inner bottom wall 44 defining a lower heating chamber 45 and an upper comestible chamber 46. Thus, the inner bottom wall 44 acts as the entire partition between the heating chamber 45 and the comestible chamber 46, and the heat transfer between the heating chamber 45 and the comestible chamber 46 is dependent upon the conductivity of the inner bottom wall 44 and the conductivity of the common side wall 41. The heating chamber 45 is also filled with the desired quantity of the above-described potassium hydroxide flakes 18, and the orthophosphoric acid 19 is contained within the same type of frangible capsule 50 as the capsule 20, such as a thin-wall glass ampoule.

Extending through the lower portion of the wall 41 adjacent the bottom wall 42 is a lever arm 52 projecting transversely below and having its free end preferably in engagement with the capsule 50. The opening 53 around the portion of the lever arm 52 extending through the bottom portion of the side wall 41 is completely sealed by a flexible sealing medium such as solder, to prevent leakage of the liquid or air, and also functions as a fulcrum for the pivotal movement of the lever arm 52 into operative engagement with the capsule 50. The outer end of the lever arm 52 forms an upwardly projecting handle member 55 which is adapted to fit flush against the outside of wall 41, as best disclosed in FIG. 4, in inoperative position. Thus, when the handle member 55 is pulled away from the wall 41, as illustrated in FIG. 5, and subsequently in FIG. 6, the lever arm 52 pivots about its sealed fulcrum joint 53 to move upward and break the capsule 50 to release its contents 49 to mix with the dry chemical 48.

Although the capsule 50 might be supported in a stationary rupturing position by brackets, such as 21 in FIGS. 2 and 3, the capsule 50 is disclosed in FIG. 4 as being supported in a bracket 57 resembling a U-shaped spring clip, fixed to and projecting upwardly from the lever arm 52. Thus, in container 40, the capsule 50 is carried upward with the lever arm 52 until it engages the wall 44, so that continued upward pressure by the lever arm 52 will squeeze and rupture the capsule 50.

The container 40 is also encased around its side and bottom walls with a layer of insulating material, also preferably a polystyrene foam 60. Here again, a portion of the side layer 60 is cut out to form a slot 61 to receive the handle arm 55 in inoperative position flush against the side wall 41. The insulating layer 60 performs the same function for container 40 as the insulating layer 30 performs for the container 10.

The top of the container 40 is closed with any convenient type of lid 64, and may be removed or opened by any of numerous conventional methods to make the contents of the comestible chamber 46 available to the consumer.

The container 40 is also made of inexpensive materials, and of course, the same inexpensive chemical reactants are incorporated in the container 10, so that the container 40 may also be inexpensively produced and marketed as a disposable product.

The operation of each of the containers 10 and 40 is very simple. After the containers are filled with their food or beverage products and sealed, they may be transported and used by the consumer in a variety of ways, almost too innumerable to mention, and provide the consumer with a heated food or beverage in sites and situations where heated food products would otherwise be unavailable. When it is desired to consume the contents of the container 10, the consumer merely turns the screw 27 until the frangible capsule 20 bursts. He then waits several seconds until the heat generated in the chamber 15 has been transferred to the entire contents of the comestible chamber 16. He opens the lid and consumes the contents while still holding the container 10 in his hand, without the hazard of burning his hand, the danger of the heating chamber exploding, or the discomfort or danger from leaking or dripping reactants.

In a similar manner, when the consumer desires to partake of the contents of the container 40, he merely grasps the handle arm 55, pulls it radially away from the container wall 41 until the lever arm 52 ruptures the capsule 50. The consumer then waits until the contents of the container 40 are heated, removes the lid 64 and partakes of the heated contents of the comestible chamber 46.

After the contents are consumed, both the containers 10 and 40 may be discarded.

It is also within the scope of this invention to provide a chemically heated stove, incorporating the heating chambers 15 or 45 of either of the containers 10 and 40, without attachment to the comestible chambers 16 and 46, respectively. In other words, the walls 14 and 44 respectively may function as hotplates to receive thereupon any article or product desired to be heated by the transfer of heat through the walls 14 and 44 from the heating chambers 15 and 45, respectively.

What is claimed is:

1. A chemically heated stove comprising:
   a. a completely enclosed heating chamber,
   b. a first chemical reactant within said heating chamber,
   c. a frangible capsule containing a second chemical reactant capable of producing an exothermic reaction when mixed with said first reactant,
   d. a bracket fixed in said chamber,
   e. said bracket holding said capsule in stationary rupturing position,
   f. said heating chamber having a movable wall opposite said bracket,
   g. a pressure actuator member,
   h. means mounting said actuator member exteriorly of said heating chamber for operative engagement with said movable wall, whereby the manual application of force to said actuator member causes said wall to squeeze said capsule in rupturing position until said capsule breaks, without rupturing said heating chamber, and
   i. means on said chamber for supporting an article to be heated in thermal communication with said chamber.

2. The invention according to claim 1 in which said pressure-actuated member comprises a threaded member, and means threadedly supporting said threaded member so that when said threaded member is turned, said wall is moved against said capsule.

3. The invention according to claim 2 in which said means threadedly supporting said threaded member comprises a rigid member fixed to said heating chamber and spanning said wall.

4. The invention according to claim 1 in which said wall is flexible.

5. The invention according to claim 4 in which said flexible wall has annular ribs to permit expansion of said wall against said capsule.

6. The invention according to claim 1 in which said article supporting means comprises a comestible container integrally constructed with and forming the upper part of said heating chamber, and having insulated walls.

7. The invention according to claim 1 in which said first chemical reactant and said second chemical reactant are adapted to produce non-gaseous, neutral products of reaction.

* * * * *